US009080644B2

(12) United States Patent
Kanehara

(10) Patent No.: US 9,080,644 B2
(45) Date of Patent: Jul. 14, 2015

(54) CONTROL APPARATUS FOR CONTINUOUSLY VARIABLE TRANSMISSION

(71) Applicant: HONDA MOTOR CO., LTD., Tokyo (JP)

(72) Inventor: Shigeru Kanehara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 13/948,212

(22) Filed: Jul. 23, 2013

(65) Prior Publication Data

US 2014/0032066 A1    Jan. 30, 2014

(30) Foreign Application Priority Data

Jul. 27, 2012   (JP) .................................. 2012-166951

(51) Int. Cl.
*F16H 9/12* (2006.01)
*F16H 61/662* (2006.01)

(52) U.S. Cl.
CPC .......... *F16H 9/125* (2013.01); *F16H 61/66272* (2013.01); *F16H 2061/66277* (2013.01)

(58) Field of Classification Search
CPC ............. F16H 55/56; F16H 9/12; F16H 9/16; F16H 9/125; F16H 61/66272; F16H 2061/66277
USPC .............................................. 474/69; 701/51
See application file for complete search history.

(56) References Cited

U.S. PATENT DOCUMENTS

| | | | | |
|---|---|---|---|---|
| 3,698,256 A | * | 10/1972 | Albertson | ........................ 474/12 |
| 5,964,818 A | | 10/1999 | Kanehara et al. | |
| 6,482,117 B1 | * | 11/2002 | Kanehara et al. | ............. 474/242 |
| 2002/0068660 A1 | * | 6/2002 | Fritzer et al. | ..................... 477/37 |
| 2002/0155910 A1 | | 10/2002 | Nishizawa et al. | |
| 2011/0316525 A1 | * | 12/2011 | Lynn | .............................. 324/173 |
| 2012/0078476 A1 | * | 3/2012 | Li et al. | ............................ 701/51 |
| 2012/0108390 A1 | * | 5/2012 | Doihara et al. | .................. 477/46 |
| 2012/0135829 A1 | * | 5/2012 | Doihara et al. | .................. 474/28 |

FOREIGN PATENT DOCUMENTS

| | | |
|---|---|---|
| JP | 10-089429 A | 4/1998 |
| JP | 2003-065428 A | 3/2003 |

OTHER PUBLICATIONS

Srivastava, Nilabh et al., "Transient dynamics of metal V-belt CVT: Effects of band pack slip and friction characteristic", Mechanism and Machine Theory, Apr. 2008, pp. 459-479, vol. 43, issue 4.*

* cited by examiner

*Primary Examiner* — Jerrah Edwards
*Assistant Examiner* — Tamara Weber
(74) *Attorney, Agent, or Firm* — Squire Patton Boggs (US) LLP

(57) ABSTRACT

In an apparatus for controlling a continuously variable transmission, a transmission ratio, an input shaft rotational speed and an input torque, etc., are detected, an axial thrusts of the drive and driven pulleys are detected therefrom, an inter-shaft force is detected, a friction coefficient of the driven pulley including at least a radial component of the friction coefficient μRDN is calculated in accordance with predetermined relational equations, a target axial thrust of the driven pulley is calculated based on at least the friction coefficient and the axial thrust of the driven pulley is controlled based on the calculated target axial thrust.

17 Claims, 10 Drawing Sheets

CONTROL APPARATUS FOR CONTINUOUSLY VARIABLE TRANSMISSION

BACKGROUND

1. Technical Field

An embodiment of the invention relates to a control apparatus for a Continuously Variable Transmission (CVT), particularly to an apparatus that controls axial thrust of the CVT.

2. Related Art

A CVT control apparatus has been proposed in an U.S. Patent Application No. 2002/0155910 A1 (partly corresponding to a Japanese Laid-Open Patent Application No. 2003-65428), in which a thrust ratio between the drive (input) pulley axial thrust and driven (output) pulley axial thrust of the CVT is determined, a peak of the thrust ratio variation caused by a change of the driven pulley axial thrust is detected from the thrust ratio and driven pulley axial thrust, and the CVT is controlled in such a manner that the driven pulley axial thrust is kept at the peak of the thrust ratio.

Specifically, the reference is based on a finding that the thrust ratio peaks slightly before the occurrence of a large belt slippage, so that the CVT should preferably controlled to keep the driven pulley thrust at its peak.

Apart from the above, another U.S. Pat. No. 5,964,818 (corresponding to a Japanese Laid-Open Patent application No. Hei10(1998)-89429) proposes a technique to calculate friction coefficients between the pulley and belt by presuming the friction coefficients of the drive and driven pulleys as appropriate values and by measuring rotational speed and input torque of the drive pulley, an axial thrust of the driven pulley, and an inter-shaft force between the input and output shafts, etc., to substituting them into relational expressions for equilibrium of force each describing parts of the CVT.

SUMMARY OF THE INVENTION

The technique of the first reference is thus configured to determine the peak of the thrust ratio and control the CVT such that the driven pulley thrust is kept at its peak. However, as mentioned there, the thrust ratio peak can not be determined until the driven pulley axial thrust approaches to the state where a belt slippage occurs.

As a result, when a margin of axial thrust variation relative to a slip safety rate is set to be small, the axial thrust can not satisfy a thrust increase request and a belt slippage may occur at the driven pulley, depending on control convergence. Accordingly, the driven pulley axial thrust should necessarily be set to an excessive value as a precaution foreseeing the slip safety rate.

An object of an embodiment of the invention is therefore to overcome the above-mentioned problem by providing a control apparatus for a continuously variable transmission that calculates a friction coefficient accurately so as to determine target axial thrust of the driven pulley appropriately, while surely preventing a belt slippage from occurring.

In order to achieve the object, the embodiment of this invention provides, in its first aspect, an apparatus for controlling a continuously variable transmission having a drive pulley mounted on an input shaft connected to a prime mover mounted on a vehicle, a driven pulley mounted on an output shaft connected to driven wheels and a power transmissible member wound around the drive and driven pulleys to be clamped therebetween in response to axial thrust acting along axes of the input and output shafts, comprising: a transmission operating state detection block that detects parameters including at least a transmission ratio, a rotational speed of the input shaft and an input torque indicative of operating state of the transmission; an axial thrust detection block that detects the axial thrusts of the drive and driven pulleys; an inter-shaft force detection block that detects an inter-shaft force indicative of a force which pulls the input shaft and the output shaft against each other; a friction coefficient calculation block that calculates a friction coefficient of the driven pulley including at least a radial component of the friction coefficient in accordance with predetermined relational equations based on the detected operating state, axial thrust and inter-shaft force; a target axial thrust calculation block that calculates target axial thrust of the driven pulley based on at least the calculated friction coefficient; and an axial thrust control block that controls the axial thrust of the driven pulley based on the calculated target axial thrust.

In order to achieve the object, the embodiment of this invention provides, in its second aspect, a method for controlling a continuously variable transmission having a drive pulley mounted on an input shaft connected to a prime mover mounted on a vehicle, a driven pulley mounted on an output shaft connected to driven wheels and a power transmissible member wound around the drive and driven pulleys to be clamped therebetween in response to axial thrust acting along axes of the input and output shafts, comprising the steps of: detecting parameters including at least a transmission ratio, a rotational speed of the input shaft and an input torque indicative of operating state of the transmission; detecting the axial thrusts of the drive and driven pulleys; detecting an inter-shaft force indicative of a force which pulls the input shaft and the output shaft against each other; calculating a friction coefficient of the driven pulley including at least a radial component of the friction coefficient in accordance with predetermined relational equations based on the detected operating state, axial thrust and inter-shaft force; calculating target axial thrust of the driven pulley based on at least the calculated friction coefficient; and controlling the axial thrust of the driven pulley based on the calculated target axial thrust.

BRIEF DESCRIPTION OF THE DRAWINGS

The above and other objects and advantages of an embodiment of this invention will be more apparent from the following description and drawings in which.

DESCRIPTION OF THE EMBODIMENT

An embodiment for carrying out a continuously variable transmission control apparatus according to the invention will now be explained with reference to the attached drawings.

Figure 1:
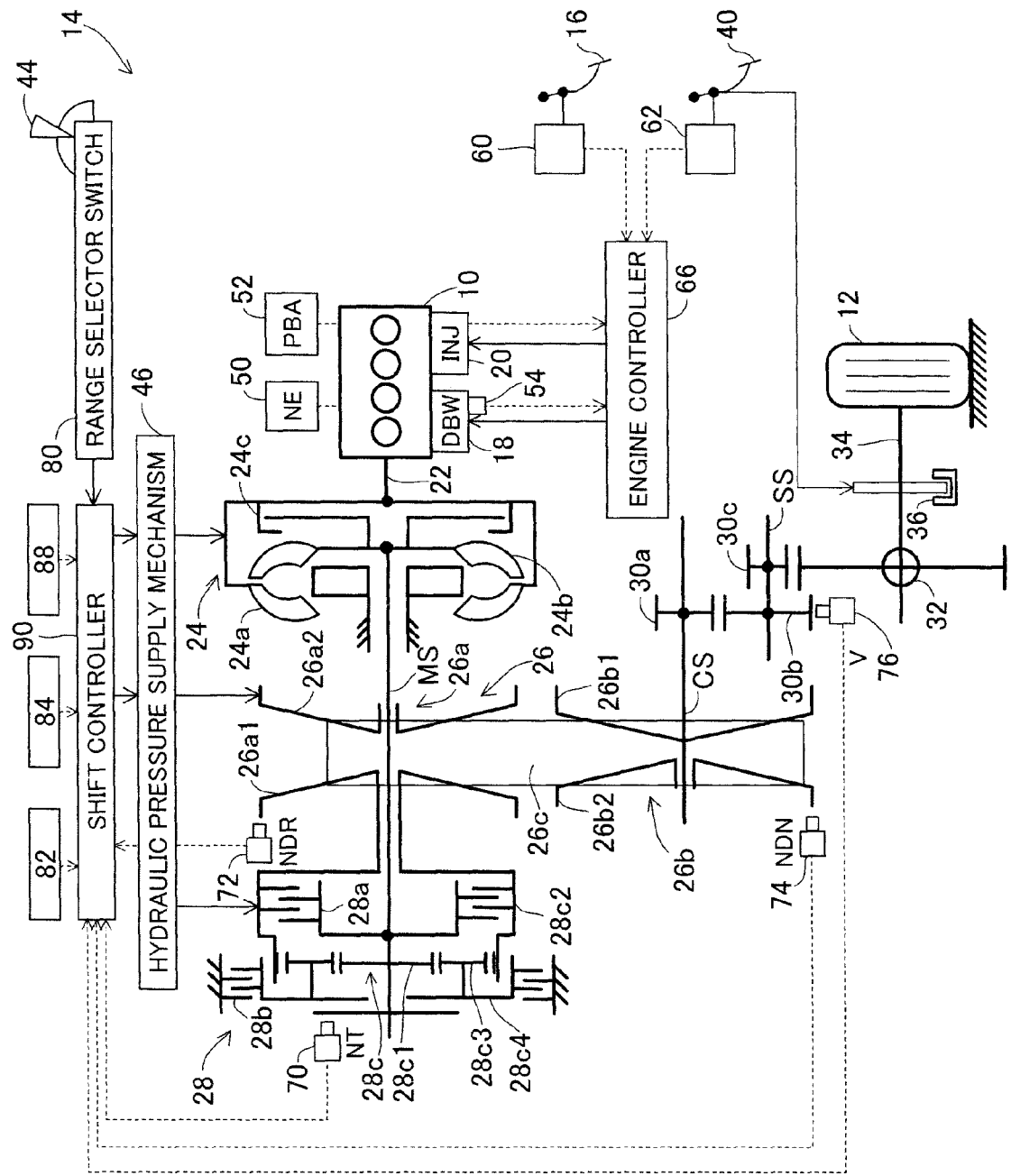
FIG. 1 is an overall view entirely showing an apparatus for controlling a continuously variable transmission (CVT) according to an embodiment of this invention wherein the CVT is shown schematically.

FIG. 1 is an overall view schematically showing a continuously variable transmission control apparatus according to an embodiment of this invention.

In FIG. 1, a symbol 10 indicates an engine (internal combustion engine; prime mover). The engine 10 is mounted on a vehicle 14 having driven wheels 12 (the vehicle 14 is partially shown with the engine 10 and driven wheel 12, etc.).

A throttle valve (not shown) installed in an air intake system of the engine 10 has no mechanical connection with an accelerator pedal 16 provided at the floor of the driver's seat of the vehicle but is connected to a DBW (Drive-By-Wire) mechanism 18 including an actuator such as an electric motor to be opened/closed thereby.

Intake air regulated by the throttle valve is flown through an intake manifold (not shown) and mixed with fuel injected from an injector 20 in the vicinity of an air intake port of each cylinder. Upon opening an air intake valve (not shown), the resulting air-fuel mixture is flown into a combustion chamber (not shown) in the cylinder concerned. The air-fuel mixture is ignited by a spark plug and burned in the combustion chamber to drive a piston (not shown) to rotate an output shaft 22 connected to the crankshaft and then discharged to the exterior of the engine 10 as exhaust gas.

The rotation of the output shaft 22 is inputted to a continuously variable transmission (hereinafter called the "CVT") 26 through a torque converter 24. Specifically, the rotation of the output shaft 22 of the engine 10 determined by a throttle opening adjusted by the DBW mechanism 18 corresponding to a driver's manipulation of the accelerator pedal 16 is inputted to the CVT 26 through the torque converter 24.

The output shaft 22 of the engine 10 is connected to a pump impeller 24a of the torque converter 24, while a turbine runner 24b installed to face the pump impeller 24a and used to receive fluid (operating oil) is connected to a main shaft (input shaft) MS. The torque converter 24 has a lockup clutch 24c.

The CVT 26 comprises a drive (DR; input or primary) pulley 26a mounted on the main shaft MS (more specifically, mounted on an outer shaft coaxially disposed around the main shaft MS), a driven (DN; output or secondary) pulley 26b mounted on a countershaft CS (more specifically, mounted on an outer shaft coaxially disposed on the counter shaft CS installed parallel to the main shaft MS), and a power transmissible member made of an endless flexible belt comprising, for instance, a metal belt 26c is wound around the pulleys 26a, 26b.

Figure 2:
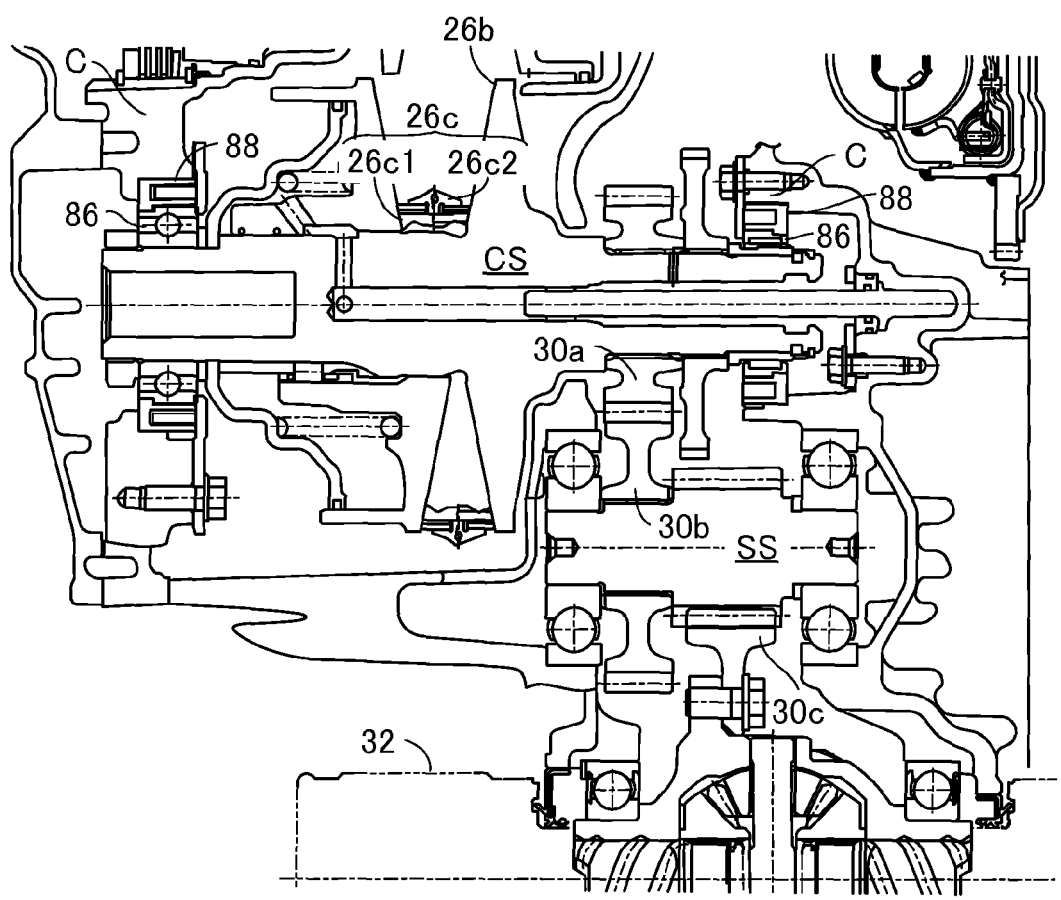
FIG. 2 is a sectional view of the CVT shown as a real machine.

FIG. 2 is a sectional view of the CVT 26 shown as a real machine and illustrating a portion around the counter shaft CS where the driven pulley 26b is installed. As shown, the belt 26c comprises two metal rings 26c1 arranged side by side and a multiple of metal blocks (elements) 26c2 coupled by the rings 26c1.

Returning to the explanation of FIG. 1, the drive pulley 26a has a fixed pulley-half 26a1 that is installed on the outer shaft of the main shaft MS to be not rotatable relative thereto and immovable in the longitudinal direction of the main shaft MS, and a movable pulley-half 26a2 that is installed on the outer shaft of the main shaft MS to be not rotatable relative thereto but movable axially in the longitudinal direction of the main shaft MS relative to the fixed pulley-half 26a1.

The driven pulley 26b has a fixed pulley-half 26b1 that is installed on the outer shaft of the countershaft CS to be not rotatable relative thereto and immovable in the longitudinal direction of the countershaft CS, and a movable pulley-half 26b2 that is installed on the outer shaft of the countershaft CS to be not rotatable relative thereto but movable axially in the longitudinal direction of the countershaft CS relative to the fixed pulley-half 26b1.

The CVT 26 is connected to the engine 10 through a forward/reverse switching mechanism 28. The forward/reverse switching mechanism 28 includes a forward clutch 28a adapted to enable the vehicle 14 to run in the forward direction, a reverse brake clutch 28b adapted to enable the vehicle 14 to run in the reverse direction, and a planetary gear mechanism 28c disposed therebetween. Thus, the CVT 26 is connected to the engine 10 through the forward clutch 28a and reverse brake clutch 28b.

In the planetary gear mechanism 28c, a sun gear 28c1 is fixed to the main shaft MS and a ring gear 28c2 is fixed to the fixed pulley-half 26a1 of the drive pulley 26a through the forward clutch 28a. A plurality of pinions 28c3 are installed between the sun gear 28c1 and ring gear 28c2. The pinions 28c3 are connected to the sun gear 28c1 through a carrier 28c4. Upon the operation of the reverse brake clutch 28b, the carrier 28c4 is fixed (locked) thereby.

The rotation of the countershaft CS is transmitted to the driven wheels 12 from a secondary shaft (intermediate shaft) SS through gears. Specifically, the rotation of the countershaft CS is transmitted to the secondary shaft SS through reduction gears 30a, 30b and the rotation of the secondary shaft SS is transmitted to the right and left driven wheels 12 (only right one is shown) through a gear 30c, a differential 32 and a drive shaft 34.

A disk brake 36 is installed near each of the driven wheels (front wheels) 12 and free wheels (rear wheels (not shown)), and a brake pedal 40 is provided at the floor of the driver's seat of the vehicle 14.

In the forward/reverse switching mechanism 28, the switching operation between the forward clutch 28a and reverse brake clutch 28b is conducted upon the driver's manipulation of a range selector 44 provided at the driver's seat of the vehicle, i.e., upon the driver's selection of one of the ranges P, R, N, D, etc. The selection in response to the driver's manipulation of the range selector 44 is transmitted to a manual valve of a hydraulic (oil) pressure supply mechanism 46.

Although not shown in the drawings, the hydraulic pressure supply mechanism 46 includes a hydraulic (oil) pump that is driven by the engine 10 to pump up the operating oil stored in a reservoir and discharges hydraulic pressure (pressurized oil) to hydraulic passages, and several control valves and electromagnetic valves that are installed in the hydraulic passages and adapted to supply hydraulic pressure to the torque converter lockup clutch 24c by regulating the hydraulic pressure pumped up by the pump to engage and disengage the lockup clutch 24c.

The valves in the hydraulic pressure supply mechanism 46 are also adapted to supply the hydraulic pressure to piston chambers of the movable pulley-halves 26a2, 26b2 to generate axial thrust along the axes of the main shaft MS and counter shaft Cs so as to move the movable pulley-halves 26a2, 26b2 in the shaft longitudinal direction.

Specifically, the pulleys 26a, 26b are each build up of two conical sheaves and the belt 26c is clamped between the sheaves by the generated axial thrust to transmit the torque from the drive pulley 26a to the driven pulley 26b. The running radius of the belt 26c is adjusted to allow the transmission ratio (gear ratio) to operate in continuous or step-less variation in response to change between the distance of the two sheaves (pulley widths of the drive pulley 26a and driven pulley 26b), whereby the rotation of the engine 10 is transmitted to the driven wheels 12.

Further, the valves in the hydraulic pressure supply mechanism 46 supply the hydraulic pressure to the piston chamber of the forward clutch 28a or the reverse brake clutch 28b through the manual valve that is operated in response to the position of the range selector 44 manipulated by the driver, thereby enabling the vehicle 14 to run forward or backward.

A crank angle sensor 50 is installed at an appropriate position, e.g., near the camshaft (not shown) of the engine 10, and produces an output or signal indicative of an engine speed NE at every predetermined crank angle position of the piston. A manifold absolute pressure sensor 52 is installed at an appropriate position downstream of the throttle valve in the intake system and produces an output or signal proportional to manifold absolute pressure (indicative of the engine load) PBA.

A throttle opening sensor 54 is installed at the actuator of the DBW mechanism 18 and produces an output or signal proportional to a throttle opening TH based on a rotational amount of the actuator.

An accelerator position (opening) sensor 60 installed near the accelerator pedal 16 produces an output or signal proportional to an accelerator position or opening AP corresponding to an amount of driver's depression (manipulation) of the accelerator pedal 16, and a brake switch 62 installed near the brake pedal 40 produces an ON signal in response to driver's depression (manipulation) of the brake pedal 40.

The outputs of the crank angle sensor 50 and other sensors are sent to an engine controller 66. The engine controller 66 has a microcomputer including a CPU, ROM, RAM, I/O, etc., and based on the sensors outputs, controls the operation of the DBW mechanism 18, the fuel injection by the injector 20, the ignition timing by the spark plug, and so on.

An NT sensor (rotational speed sensor) 70 is installed at the main shaft MS and produces a pulse signal indicative of a rotational speed NT of the turbine runner 24b, specifically a rotational speed of the main shaft MS, more specifically an input shaft rotational speed of the transmission and the forward clutch 28a.

An NDR sensor (rotational speed sensor) 72 is installed at an appropriate position near the drive pulley 26a of the CVT 26 and produces a pulse signal indicative of a rotational speed NDR of the drive pulley 26a, specifically an output shaft rotational speed of the forward clutch 28a.

An NDN sensor (rotational speed sensor) 74 is installed at an appropriate position near the driven pulley 26b of the CVT 26 and produces a pulse signal indicative of a rotational speed NDN of the driven pulley 26b, specifically a rotational speed of the countershaft CS, more specifically an output shaft rotational speed of the transmission.

A vehicle speed sensor 76 is installed near the gear 30b of the secondary shaft SS and produces a pulse signal once per prescribed angular rotation of the secondary shaft SS and a rotational direction thereof (i.e., a pulse signal indicative of a vehicle speed V).

A range selector switch 80 is installed near the range selector 44 and produces an output or signal indicative of a range such as P, R, N, D or the like selected by the driver.

A hydraulic pressure sensor 82 is installed at an appropriate location of the hydraulic passages of the hydraulic pressure supply mechanism 46 and produces an output or signal indicative of hydraulic pressure supplied to the piston chamber of the movable pulley-half 26b2 of the driven pulley 26b. A hydraulic temperature sensor 84 is disposed in the reservoir and produces an output or signal indicative of temperature of the operating oil.

A load sensor 88 in a ring or annular shape is installed, as shown in FIG. 2, in the vicinity of a bearing 86 disposed around the driven pulley 26b provided on the countershaft CS, more specifically at a location between an outer lace and a transmission case C and produces an output or signal indicative of a load acting there.

The outputs of the abovementioned NT sensor 70, etc., are sent to a shift controller 90. The shift controller 90 also has a microcomputer including a CPU, ROM, RAM, I/O, etc., and is configured to be communicatable with the engine controller 66.

The shift controller 90 determines an inter-shaft force that indicates a pulling force pulled between the axes of the main shaft MS and countershaft CS through vector calculation, by determining an acting force and a direction of the force against the bearings 86 from the output of the load sensor 88. Based on the detected and determined values, the shift controller 90 energizes and de-energizes electromagnetic solenoids of the hydraulic pressure supply mechanism 46 to control the operation of the forward/reverse switching mechanism 28, CVT 26 and torque converter 24.

Figure 3:
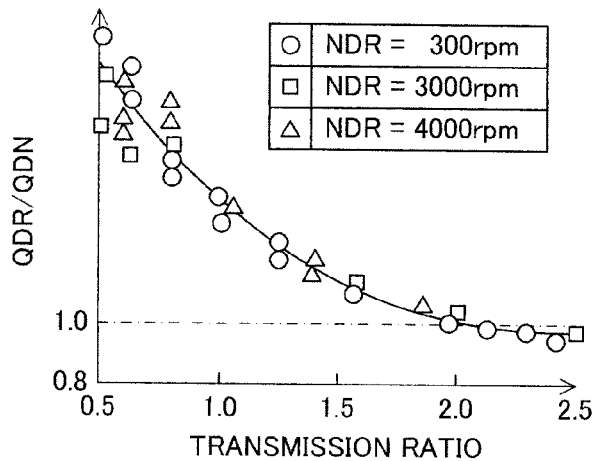
FIG. 3 is an explanatory view showing a relationship between a transmission ratio and axial thrust ratio of the CVT shown in FIG. 1.

FIG. 3 is an explanatory view showing a relationship between the transmission ratio (gear ratio) and an axial thrust ratio (a ratio between input shaft axial thrust QDR and driven pulley axial thrust QDN expressed by QDR/QDN) when a torque ratio (ratio of an input torque (inputted to the drive pulley 26a) relative to a maximum torque transmittable by the CVT 26) are within a practical region As shown, the pulley whose axial thrust is low and at which the belt slippage is liable to occur is the driven pulley 26b, except for the ratio at a distal low end. FIG. 3 shows that the axial thrust ratio (QDR/QDN) is greater than 1.0, except for the distal low end side and that the axial thrust of the driven pulley is relatively low.

This means that to control the axial thrust of the lower one, i.e., the driven pulley 26b will improve transmission efficiency and prevent belt slippage due to reduced, but sufficient axial thrust. For that reason, the embodiment will be explained mainly focusing on axial thrust control at the side of the driven pulley 26b.

Figure 4:
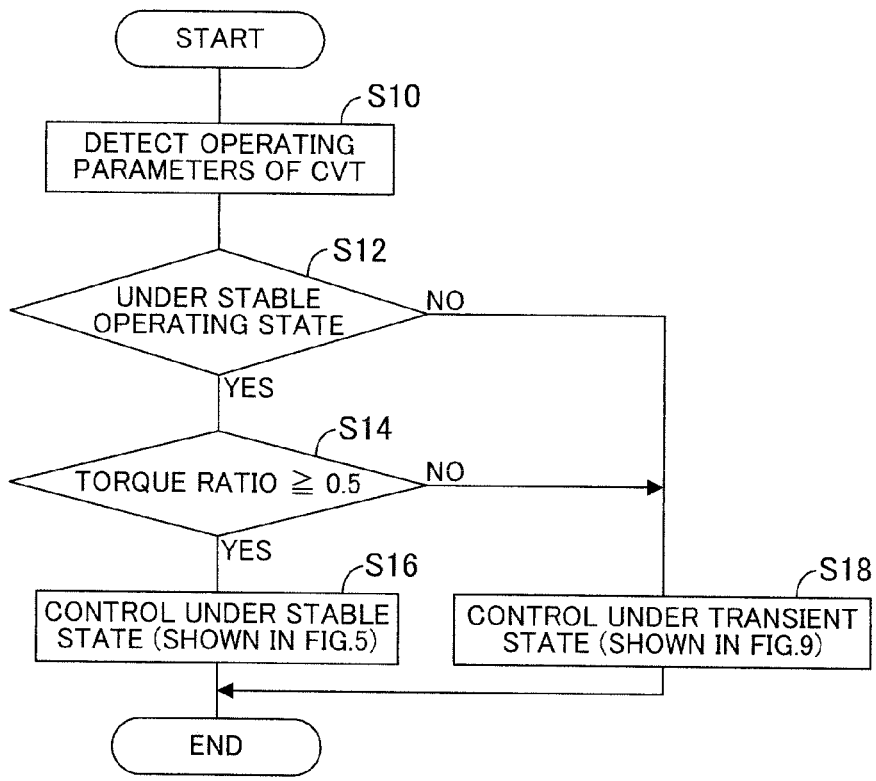
FIG. 4 is a main flowchart showing the operation of the apparatus shown in FIG. 1.

FIG. 4 is a main flowchart showing the operation of the apparatus (shift controller 90), more specifically CVT control depending on power-transmission state and torque ratio.

Explaining this, the program begins at S10, in which various operating parameters indicative of the CVT 26, including the rotational speed NDR of the drive pulley 26a, input toque inputted to the drive pulley 26a, ratio (actual transmission ratio of the drive pulley 26a and the driven pulley 26b), vehicle speed V, accelerator pedal position AP, axial thrust QDR of the drive pulley 26a and axial thrust QDN of the driven pulley 26b are detected or calculated.

The axial thrusts QDR, QDN are detected from hydraulic pressures supplied through the mechanism 46 to the piston chambers of the movable halves 26a2, 26b2 of the drive and driven pulleys 26a, 26b. The axial thrust QDR of the drive pulley 26a means a thrust that pushes the movable drive pulley 26a in the axial direction of the main shaft MS, whereas the axial thrust QDN of the driven pulley 26b means a thrust that pushes the movable driven pulley 26b in the axial direction of the counter shaft CS.

The program next proceeds to S12, in which it is discriminated whether power transmission of the CVT 26 is under a stable state. This is done by discriminating whether the parameters detected in S10 such as the ratio, input torque, drive pulley rotational speed NDR and axial thrusts QDR, QDN, etc., fluctuate little for a predetermined period of time and when they fluctuate little, it is discriminated that the power transmission of the CVT 26 is under the stable state.

When the power transmission of the CVT 26 is discriminated to be under the stable state and the result in S12 is affirmative, the program proceeds to S14, in which it is determined whether the torque ratio is equal to or greater than a predetermined value, e.g., 0.5.

As mentioned above, the torque ratio indicates a ratio of the input torque (inputted to the drive pulley 26a) relative to the maximum torque transmittable by the CVT 26. The input torque is obtained by multiplying an output torque of the engine 10 (equal to the engine torque obtained by retrieving predetermined characteristics by the engine speed NE and engine load (such as the manifold absolute pressure PBA)) by an efficiency of the torque converter 24.

When the result in S14 is affirmative, the program proceeds to S16, in which a control under the stable state including calculation of friction coefficients μ is conducted for the CVT 26. On the other hand, when the result in S12 or S14 is negative, the program proceeds to S18, in which a control under a transient state is conducted for the CVT 26.

Figure 5:
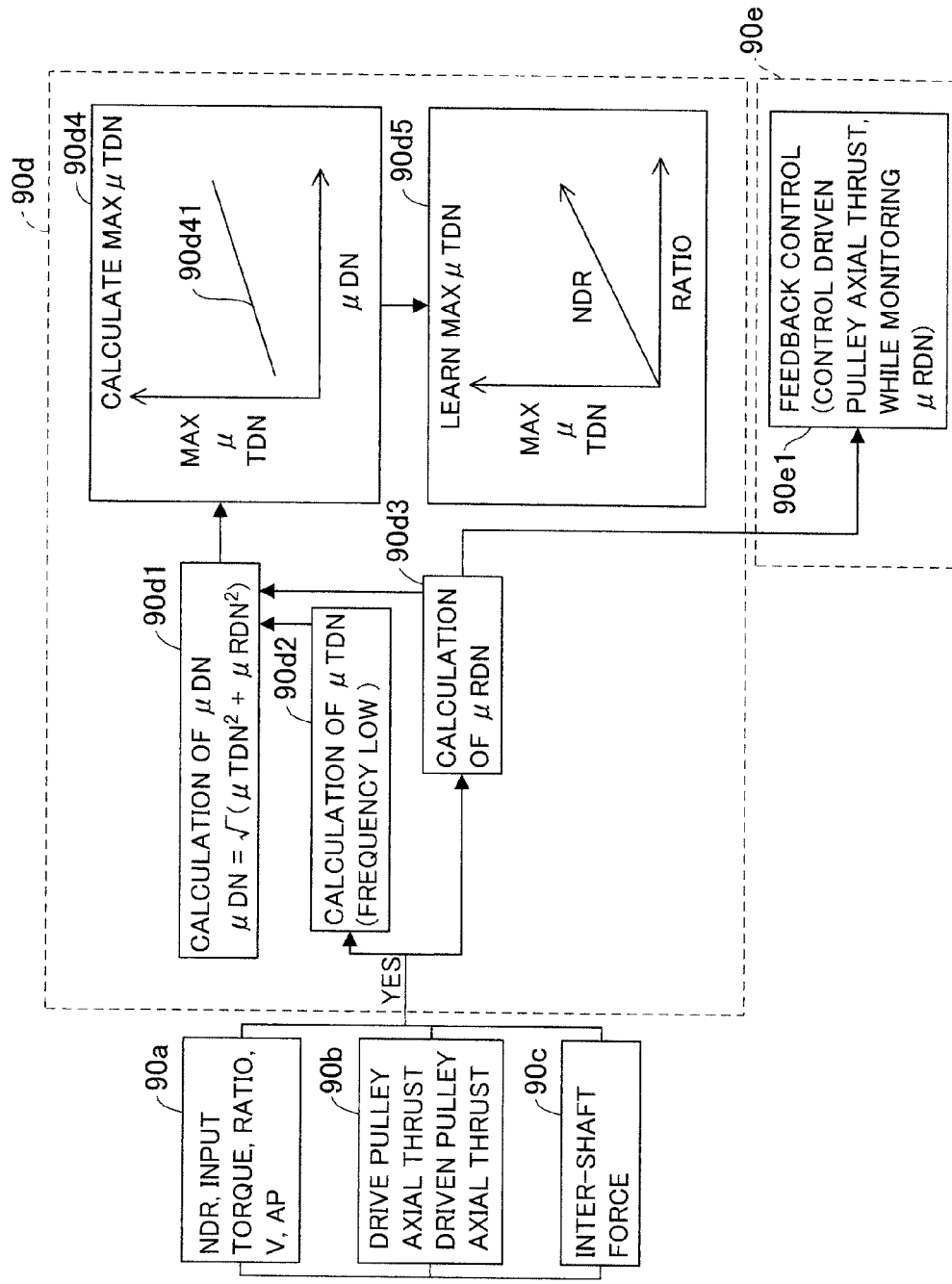
FIG. 5 is a block diagram showing a control under a stable state of S16 in the flowchart of FIG. 4.

FIG. 5 is a block diagram showing the control under the stable state of S16 in the flowchart of FIG. 4.

In order to conduct the control under the stable state, the shift controller 90 is provided with an operating state detection block (means) 90a, an axial thrust detection block (means) 90b, an inter-shaft force detection block (means) 90c, a friction coefficient calculation block (means) 90d and an axial thrust control block (means) 90e.

In the operating state detection block 90a, from among the aforesaid parameters, the drive pulley rotational speed NDR, input toque, ratio, vehicle speed V and accelerator pedal position AP are detected or calculated from the sensor outputs In the axial thrust detection block 90b, the axial thrust QDR of the drive pulley 26a and the axial thrust QDN of the driven pulley 26b are detected or calculated from the sensor outputs indicative of the hydraulic pressure supplied to their piston chambers as mentioned above.

In the inter-shaft force detection block 90c, the inter-shaft force, i.e., the force that pulls the main shaft MS and counter shaft CS against each other is detected or calculated from the output of the load sensor 88.

The friction coefficient calculation block 90d includes an average friction coefficient calculation block 90d1, a friction coefficient's tangent component calculation block 90d2 and a friction coefficient's radial component calculation block 90d3.

In the average friction coefficient calculation block 90d1, the average friction coefficient μDN of the driven pulley 26b, precisely the coefficient between the pulley 26b and the belt 26c, more precisely the coefficient between the pulley 26b and the blocks 26c2 of the belt 26c is calculated based on the detected operating state, axial thrusts and inter-shaft force in accordance with predetermined relational equations.

To be more specific, the friction coefficient's tangent component calculation block 90d2 calculates a tangent component of the friction coefficient μTDN of the driven pulley 26b relative to the blocks 26c2 of the belt 26c in accordance with a predetermined relational equation, and the friction coefficient's radial component calculating block 90d3 calculates a radial component of the friction coefficient μRDN of the driven pulley 26b relative to the blocks 26c2 of the belt 26c in accordance with a predetermined relational equation.

The tangent component of the friction coefficient μTDN and the radial component of the friction coefficient μRDN calculated in the blocks 90d2, 90d3 are inputted to the average friction coefficient block 90d1, in which the average friction coefficient μDN of the driven pulley 26b is calculated from the inputted friction coefficients μTDN, μRDN, more precisely by obtaining a vector sum by squaring them and by adding together to calculate a squared root, as illustrated in the block 90d1. Thus, the average friction coefficient μDN includes at least the radial component of the friction coefficient μRDN.

Since the calculations of the tangent component of the friction coefficient μTDN, radial component of the friction coefficient μRDN and average friction coefficient μDN relative to the blocks 26c2 of the belt 26c in accordance with the relational equations concerned are mentioned in the aforementioned second reference, detailed explanation is omitted here.

In the embodiment, since the radial component of the friction coefficient μRDN can be used in a feedback control, contrast to the tangent component of the friction coefficient μTDN, a calculation frequency of the radial component of the friction coefficient μRDN in the block 90d3 is set to be greater than that of the tangent component of the friction coefficient μTDN in the block 90d2.

More specifically, the tangent component of the friction coefficient μTDN is to be calculated in the block 90d2 at an interval of a predetermined travel distance of the vehicle 14 (or a predetermined time period like weeks, months), whereas the radial component of the friction coefficient μRDN is to be calculated in the block 90d3 at a quite shorter interval such as a predetermined time period like 10 milliseconds.

Further, the friction coefficient calculation block 90d includes a friction coefficient's maximum tangent component calculation block 90d4, in which a maximum tangent component of the friction coefficient MAXμTDN of the driven pulley 26b relative to the blocks 26c2 of the belt 26c is calculated or estimated from the average friction coefficient μDN (so-called the friction coefficient between the belt 26c and pulley 26a or 26b) based on predetermined characteristics 90d41. The coefficient MAXμTDN indicates a maximum value of the tangent component just before an occurrence of the belt 26c slippage from the driven pulley 20b.

Furthermore, the friction coefficient calculation block 90d includes a learning block 90d5, in which the maximum tangent component of the friction coefficient MAXμTDN is learned with respect to a predetermined parameter (more specifically the drive pulley rotational speed NDR and the ratio) when the vehicle 14 runs, and the coefficient MAXμTDN is updated (corrected by learning) based on the learned value.

Figure 6:
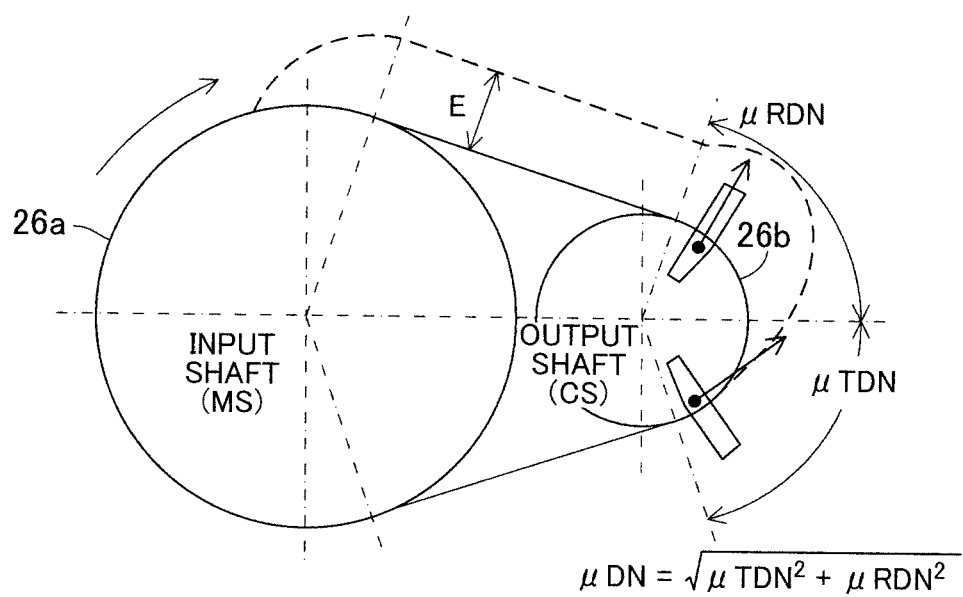
FIG. 6 is an explanatory view for explaining a calculation mechanism of the friction coefficient calculation block shown in FIG. 5.
Figure 7A:
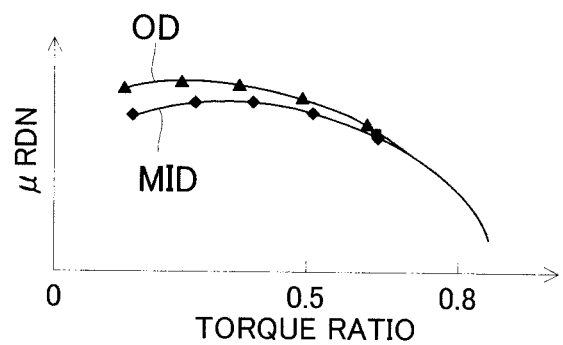
FIG. 7A to FIG. 7C are a set of explanatory views for explaining characteristics of the friction coefficients shown in FIG. 6.
Figure 7B:
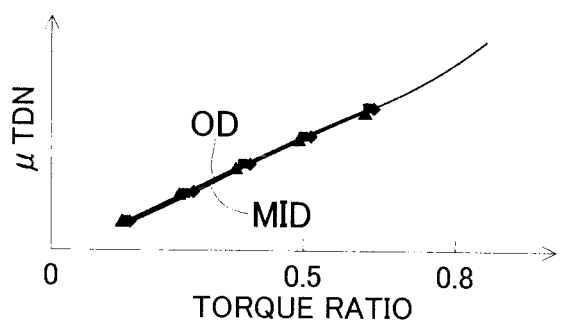
Figure 7C:
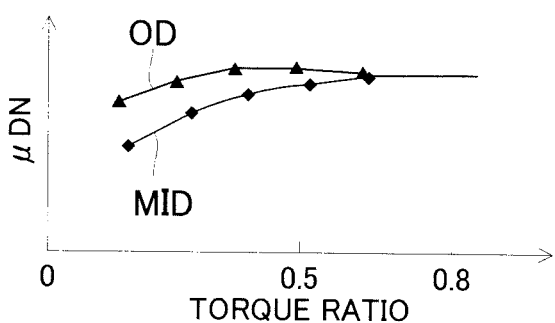

FIG. 6 is an explanatory view for explaining a calculation mechanism of the friction coefficient calculation block 90d, and FIG. 7A to FIG. 7C are a set of explanatory views for explaining characteristics of the aforesaid friction coefficients μRDN, μTDN, μDN (calculated in the block 90d) relative to the torque ratio when the ratio is at a mid (of the LOW end and OD (high) end) and at the OD end.

As will be understood from FIG. 6 and FIG. 7A to 7B, the radial component of the friction coefficient μRDN exhibits characteristics that it is large at the inlet of the driven pulley 26b and decreases as the outlet approaches, whereas the tangent component of the friction coefficient μTDN exhibits characteristics opposite thereto.

Specifically, as the torque ratio increases, the tangent component of the friction coefficient μTDN increases (area where the coefficient μTDN is large increases), while the radial component of the friction coefficient μRDN decreases (area where the coefficient μRDN is large decreases). In FIG. 6, "E" indicates a belt pushing force (force that the blocks 26c2 push the belt 26c).

Also, as shown in FIG. 7A, the radial component of the friction coefficient μRDN decreases with increasing torque ratio and decreases sharply when the torque ratio increases to 0.8 or thereabout.

As shown in FIG. 7C, the average friction coefficient μDN becomes substantially constant when the torque ratio increases to 0.5 or thereabout. Thus, the average friction coefficient μDN calculated in the block 90d1 tends to be constant when the torque ratio is equal to or greater than 0.5.

Based on the above, utilizing the fact that the average friction coefficient μDN can be reliably calculated at the operating state where the torque ratio is 0.5 or more (meaning that no belt slippage could occur), the inventor found it is possible to calculate the friction coefficient MAXμTDN (indicating the state just before the occurrence of the belt slippage at the driven pulley 26b) and to predict the occurrence of the belt slippage at the driven pulley 26b accurately from the radial component of the friction coefficient μRDN (as will be mentioned below with reference to FIG. 8), and hence, invented the present invention.

Returning to the explanation of FIG. 5, the axial thrust control block 90e includes a feedback control block 90e1, in which the axial thrust of the driven pulley 26b is controlled based on a target axial thrust calculated such that the calculated radial component of the friction coefficient μRDN is within a predetermined range. As will be understood from the flowchart of FIG. 4, when the operating state is not discriminated to be stable, the feedback control is discontinued since the program does not proceed to S16 at that state.

Figure 8:
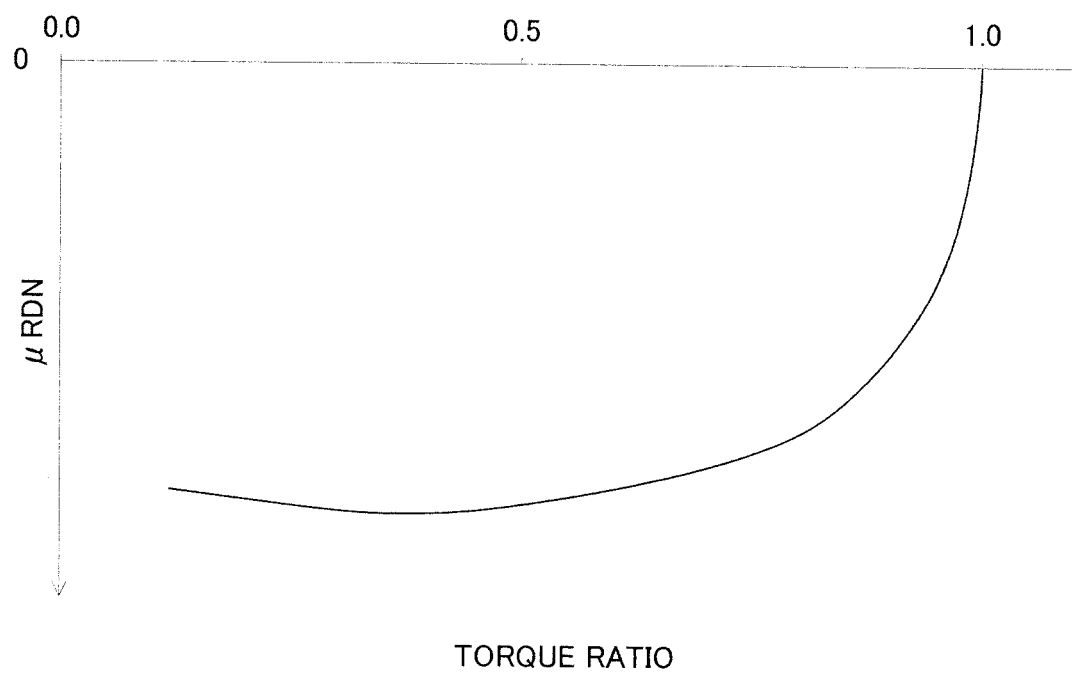
FIG. 8 is an explanatory view, similarly to FIG. 7A, for explaining characteristics of the radial component of the friction coefficient μRDN shown in FIG. 6.

FIG. 8 is an explanatory view, similarly to FIG. 7A, for explaining characteristics of the radial component of the friction coefficient μRDN relative to the torque ratio. In FIG. 8, the characteristics of FIG. 7 are made upside down.

As shown in FIG. 8, since the radial component of the friction coefficient μRDN approaches zero sharply just before entire (not local) slippage of the belt 26c, it becomes possible to predict entire slippage of the belt 26c is closing near by monitoring μRDN.

Accordingly, in the feedback control block 90e1, the axial thrust of the driven pulley 26b is controlled in such a manner that the calculated radial component of the friction coefficient μRDN is within the predetermined range, in other words, the coefficient is fell within the predetermined range (that is not zero, but is close to zero), when the operation of the driven pulley 26b is determined to be under the stable state.

Returning to the explanation of FIG. 4, when it is discriminated that power transmission state of the CVT 26 is not stable and hence the result in S12 is negative, the program proceeds to S18, in which a transient control is conducted.

Figure 9:
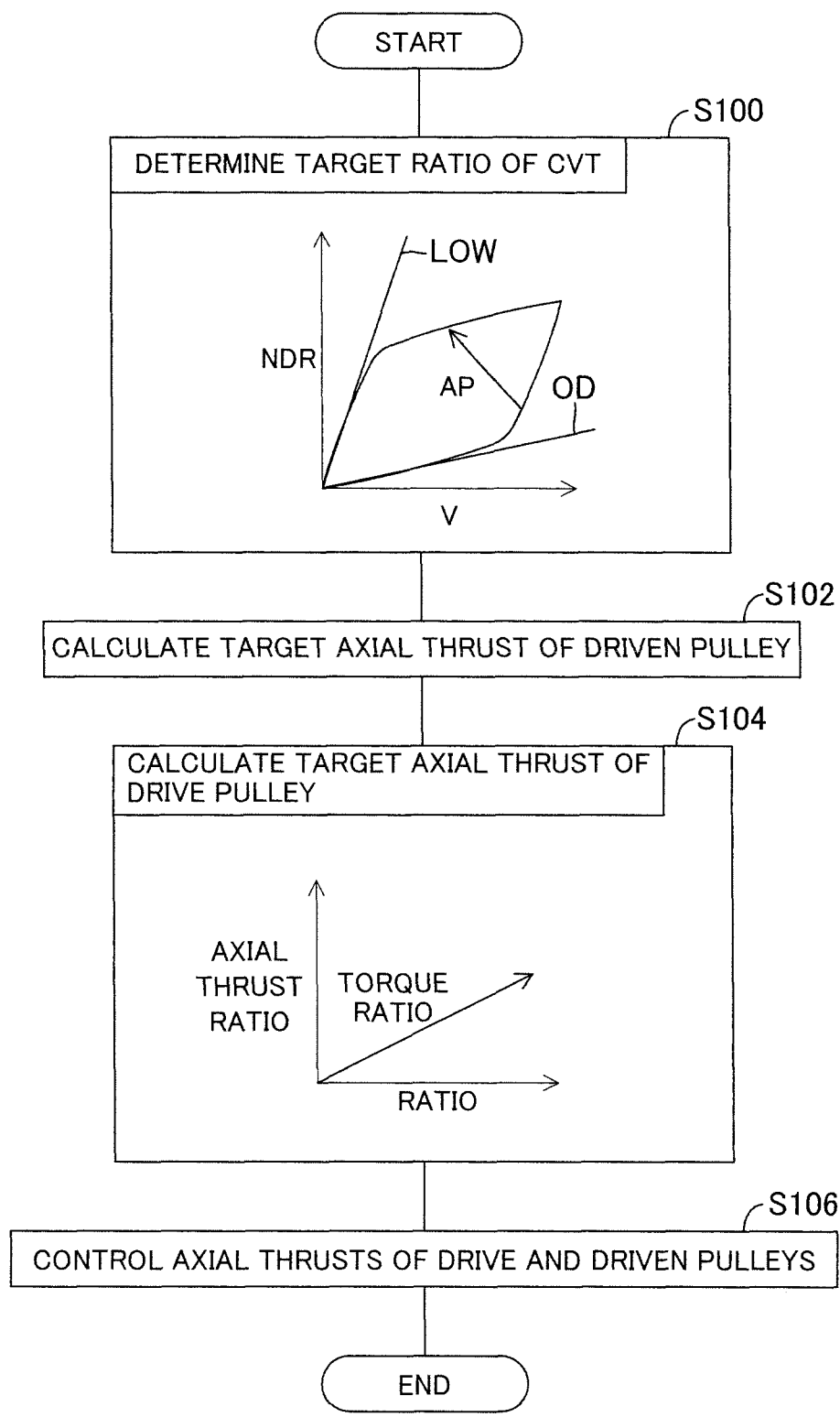
FIG. 9 is a subroutine flowchart of the processing of S18 in the flowchart of FIG. 4.

FIG. 9 is a subroutine flowchart of the processing in S18.

Explaining this, the program begins at S100, in which a target ratio of the CVT 26 is determined based on illustrated characteristics from the detected parameters. Specifically, a target transmission ratio of the CVT 26 is determined by retrieving the characteristics from the drive pulley rotational speed NDR, vehicle speed V and accelerator pedal position AP.

The program then proceeds to S102, in which a target axial thrust of the driven pulley 26b is determined, based on the retrieved target ratio and detected drive pulley rotational speed NDR, such that the friction coefficient μ of the driven pulley 26b corrected by the friction coefficient MAXμTDN (corrected by learning (updated) with respect to the drive pulley rotational speed NDR and ratio), belt winding radii of the driven pulley 26b, and input torque becomes prescribed values.

The program then proceeds to S104, in which a target axial thrust of the drive pulley 26a is calculated based on the target ratio and torque ratio in accordance with characteristics shown there. Specifically, the target axial thrust of the drive pulley 26a is calculated by multiplying the target axial thrust of the driven pulley 26b (calculated in S102) by the ratio QDR/QDN (axial thrust ratio of the driven pulley 26b relative to that of the drive pulley 26a).

The program then proceeds to S106, in which the axial thrusts of the drive pulley 26a and driven pulley 26b are controlled based on the target axial thrusts of the drive and driven pulleys 26a, 26b.

As mentioned above, since the embodiment is configured such that the radial component of the friction coefficient μRDN and the average friction coefficient μDN of the driven pulley 26b is calculated from the detected operating state, axial thrust ratio and inter-shaft force, and the axial thrust of the driven pulley 26b is controlled based on the friction coefficients μRDN or μDN, it becomes possible to calculate the friction coefficient of the driven pulley 26b accurately and hence, to reduce the unnecessarily excessive axial thrust that would otherwise be added if the friction coefficient of the driven pulley 26b is not accurate.

In particular, since it is configured such that the axial thrust is feedback controlled, while monitoring the radial component of the friction coefficient μRDN, it becomes possible to reduce the unnecessarily excessive axial thrust to a further extent, thereby enabling to improve transmission efficiency of the CVT 26 and fuel consumption of the engine 10.

Further, it is configured such that the maximum tangent component of the friction coefficient MAXμTDN that means the friction coefficient just before the occurrence of a belt slippage at the driven pulley 26b is calculated from the average coefficient μDN in accordance with predetermined characteristics 90d41 and the axial thrust is controlled based thereon. With this it becomes possible to detect a value between the pulley 26a, 26b and belt 26c that should be a base of axial thrust control and based thereon, to supply a necessary and sufficient axial thrust to the driven pulley 26b, thereby enabling to surely prevent the slippage due to unexpected friction coefficient shortage. The characteristics 90d41 are preset beforehand based on the finding that there is a close proportional relationship between the maximum tangent component of the friction coefficient MAXμTDN and the average friction coefficient μDN.

Further, it is configured such that the characteristics 90d41 are preset beforehand and based on the characteristics, the maximum tangent component of the friction coefficient MAXμTDN is calculated from the average coefficient μDN. With this, it becomes possible to calculate the coefficient MAXμTDN from the characteristics 90d41 with the coefficient μDN easily, even if they do not match each other due to a difference in pulley surface property, etc. Accordingly, it becomes possible to reduce the unnecessarily excessive axial thrust and to improve transmission efficiency and fuel consumption, while preventing the slippage due to unexpected friction coefficient decrease.

Further, since it is configured such that the friction coefficient, in particular the coefficient MAXμTDN and coefficient μDN are calculated at the interval of a predetermined travel distance, for example, and the coefficient MAXμTDN is learned, it becomes unnecessary to determine the axial thrust excessively which would otherwise be added as or by taking a drop of the coefficient after long travel of the vehicle 14 into account, thereby enabling to achieve the abovementioned effects more surely. Since the axial thrust is determined to be a reduced value even when the vehicle 14 is new, it becomes possible to enhance the service life of the pulleys 26a, 26b and belt 26c of the CVT 26.

Further, in the embodiment, except for the ratio at the low end, the pulley whose axial thrust is low is the driven pulley 26b, it becomes possible to control the axial thrust of the lower one (driven pulley 26b) properly. If the axial thrust of the drive pulley 26a is lower than that of the driven pulley 26b, the axial thrust of the drive pulley 26a can be presumed from the axial thrust of the driven pulley 26b using the predetermined axial thrust ratio of QDR/QDN. Depending on a model of the angle of pulley sheaves, the driven pulley is lower in the axial thrust than the drive pulley and in that case, it becomes possible to control it more appropriately.

Figure 10:
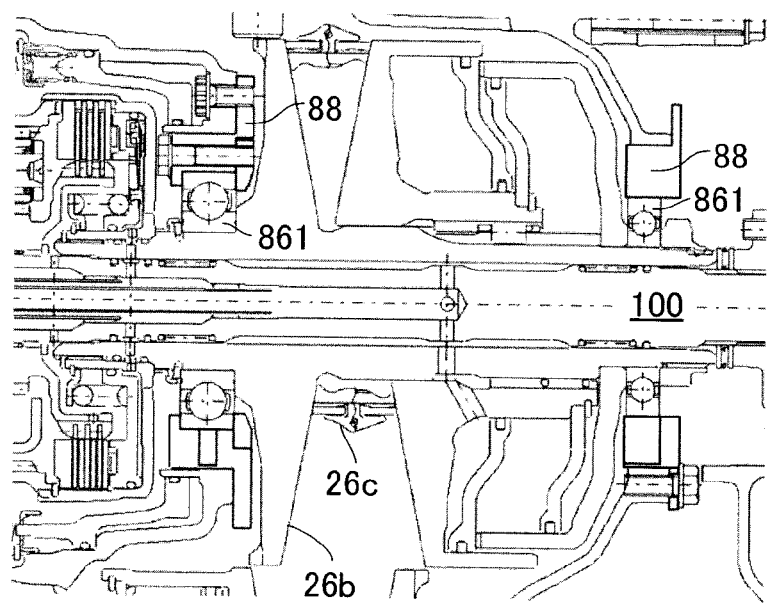
FIG. 10 is a sectional view, similar to FIG. 2, but showing another model of the CVT.

FIG. 10 is a sectional view, similar to FIG. 2, but showing another model of the CVT 26, in which a drive shaft 100 is made as the output shaft and on the shaft, the driven pulley 26b is installed. The load sensor 88 is positioned at a location between the outer lace and the transmission case C. Since there is no helical gear or spur gear that could generate a bending moment, this structure can improve the detection accuracy of the sensor 88.

Figure 11:
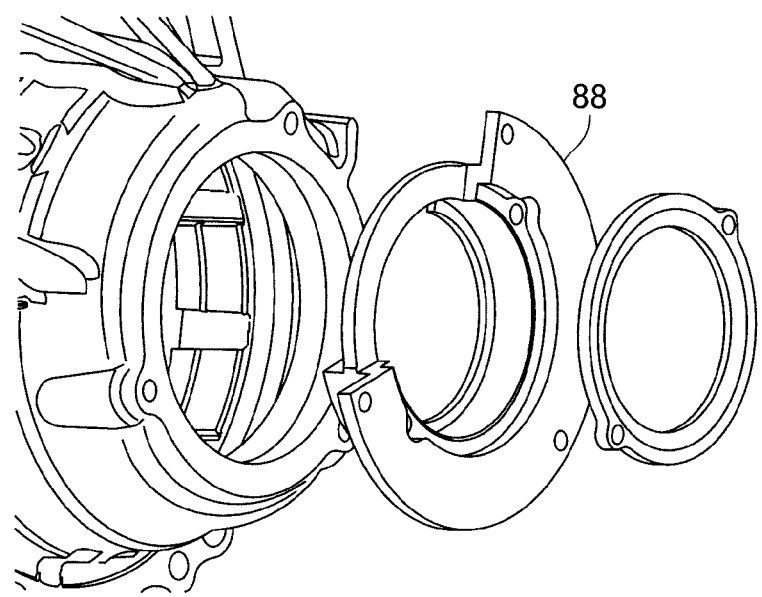
FIG. 11 is an exploded perspective view of parts of FIG. 10 including a sensor.
Figure 12:
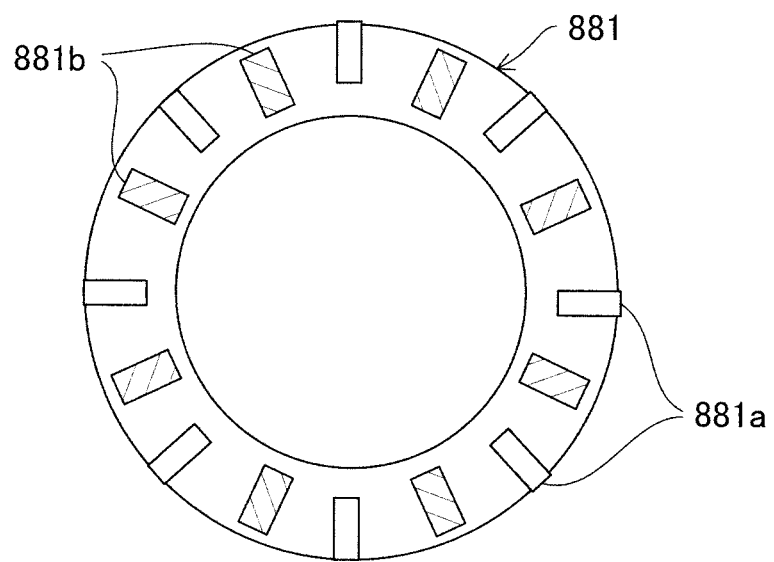
FIG. 12 is a plan view of a detection unit of the sensor shown in FIG. 11.

FIG. 11 is an exploded perspective view of parts of FIG. 10 including the sensor 88, and FIG. 12 is a plan view of a detection unit 881 of the sensor 88a. As shown, the detection unit 881 of the sensor 88 is cut out radially to form slits 881a and detection elements 881b are provided in between the slits 881a. With this, it becomes possible to detect a force locally acting on the shafts.

It should be noted that, since the inter-shaft force becomes the same value when detected either side of the drive pulley 26a and driven pulley 26b due to the relation of action and reaction, the sensor 88 can be located at the input shaft side.

Thus, the embodiment is configured to have an apparatus and method for controlling a continuously variable transmission (26) having a drive pulley (26a) mounted on an input shaft (MS) connected to a prime mover (10) mounted on a vehicle (14), a driven pulley (26b) mounted on an output shaft (CS) connected to driven wheels (12) and a power transmissible member (26c) wound around the drive and driven pulleys (26a, 26b) to be clamped therebetween in response to axial thrust acting along axes of the input and output shafts, comprising: a transmission operating state detection block (90, 90a) that detects parameters including at least a transmission ratio, a rotational speed of the input shaft and an input torque indicative of operating state of the transmission, an axial thrust detection block (90, 90b) that detects the axial thrusts of the drive and driven pulleys (26a, 26b), an inter-shaft force detection block (90, 90c) that detects an inter-shaft force indicative of a force which pulls the input shaft (MS) and the output shaft (CS) against each other, a friction coefficient calculation block (90, 90d) that calculates a friction coefficient of the driven pulley (26b) and the member (26c) including at least a radial component of the friction coefficient μRDN in accordance with predetermined relational equations based on the detected operating state, axial thrust and inter-shaft force, a target axial thrust calculation block (90, S104) that calculates target axial thrust of the driven pulley (26b) based on at least the calculated friction coefficient, and an axial thrust control block (90, 90e, S106) that controls the axial thrust of the driven pulley based on the calculated target axial thrust.

With this, it becomes possible to calculate the friction coefficient of the driven pulley 26b accurately and hence, to reduce the unnecessarily excessive axial thrust that would otherwise be added if the friction coefficient of the driven pulley 26b is not accurate, and to determine the target axial thrust of the driven pulley 26b accurately, thereby enabling to prevent the belt slippage surely and to improve transmission efficiency of the CVT 26 and fuel consumption of the engine 10.

In the apparatus and method, the friction coefficient calculation block calculates the radial component of the friction coefficient μRDN and a tangent component of the friction coefficient μTDN of the driven pulley (26b) in accordance with the predetermined relational equations, calculates an average friction coefficient μDN of the driven pulley (26b) from the calculated radial component of the friction coefficient μRDN and the tangent component of the friction coefficient μTDN, and calculates a maximum tangent component of the friction coefficient MAXμTDN of the driven pulley (26b) indicative of a friction coefficient just before the member (26c) slips from the driven pulley (20b), and the target axial thrust calculation block calculates the target axial thrust based on at least the maximum tangent component of the friction coefficient MAXμTDN.

With this, in addition to the effects and advantages mentioned above, it becomes possible to calculate the friction coefficients of the driven pulley 26b more accurately. Further, since it is configured such that the maximum tangent component of the friction coefficient MAXμTDN (that means the friction coefficient just before the occurrence of belt slippage at the driven pulley 26b) is calculated and the axial thrust is controlled based thereon, it becomes possible to reduce the excessive axial thrust and to surely prevent the slippage due to unexpected friction coefficient shortage.

Further, since it is configured such that the average friction coefficient μDN is used, if an operating oil whose property is quite different from the expected friction coefficients, it becomes possible to detect the use of the oil from the value of the calculated friction coefficient and to alert the driver.

In the apparatus and method, the friction coefficient calculation block includes a learning block (90d5) that learns the maximum tangent component of the friction coefficient MAXμTDN with respect to a predetermined parameter to update the maximum tangent component of the friction coefficient MAXμTDN when the vehicle (14) runs, and the target axial thrust calculation block calculates the target axial thrust based on at least the updated friction coefficient MAXμTDN. With this, in addition to the effects and advantages mentioned above, even when a travel distance is elongated, it becomes possible to calculate the target axial thrust appropriately, thereby enabling to reduce the excessive axial thrust and to improve the transmission efficiency and fuel consumption.

In the apparatus and method, the friction coefficient calculation block includes a torque ratio calculation block (90, S14) that calculates a torque ratio indicative of a ratio of the input torque relative to a maximum torque transmittable by the transmission, and calculates the friction coefficient when the calculated torque ratio is equal to or greater than a predetermined value. With this, it becomes possible to calculate the friction coefficient of the driven pulley 26b, without affected by the torque, thereby enabling to calculate the friction coefficient of the driven pulley 26b more accurately.

In the apparatus and method, the axial thrust control block includes a power transmission state discrimination block (90, S12) that discriminates whether a power transmission of the transmission (26) is under a stable state and when it is under the stable state, controls the axial thrust of the driven pulley based on the calculated target axial thrust in such a manner that the radial component of the friction coefficient μRDN is within a predetermined range (90, S16, 90e1).

With this, in addition to the effects and advantages mentioned above, it becomes possible to calculate the target axial thrust more appropriately to reduce the excessive axial thrust to a further extent and to prevent an unexpected slippage surely by controlling the axial thrust of the driven pulley 26b in such a manner that the calculated radial component of the friction coefficient μRDN is within the predetermined range, i.e., within the range not zero, but is close to zero.

In the apparatus and method, the axial thrust control block controls the axial thrust of the drive pulley based on a predetermined ratio of the axial thrust of the drive pulley (26a) and the axial thrust of the driven pulley (26b) (S104, S106). With this, in addition to the effects and advantages mentioned above, even when the axial thrust of the drive pulley 26a is lower than that of the driven pulley 26b, the axial thrust of the drive pulley 26a can be presumed from the driven pulley 26b using the axial thrust ratio of QDR/ QDN. Accordingly, it becomes possible to calculate the target axial thrust more appropriately to reduce the excessive axial thrust to a further extent and to prevent an unexpected slippage surely.

In the apparatus and method, the inter-shaft force detection block (90, 90c) comprises a load sensor (88) installed at a location close to a bearing of one of the input shaft (MS) and the output shaft (CS). With this, in addition to the effects and advantages mentioned above, it becomes possible to install the load sensor 88 easily and to enhance its detection accuracy.

It should be noted in the above that although the CVT 26 is exemplified by a belt type CVT, the CVT may be a chain type or a belt type.

Japanese Patent Application No. 2012-166951, filed on Jul. 27, 2012, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling a continuously variable transmission having a drive pulley mounted on an input shaft connected to a prime mover mounted on a vehicle, a driven pulley mounted on an output shaft connected to driven wheels and a power transmissible member wound around the drive and driven pulleys to be clamped therebetween in response to axial thrust acting along axes of the input and output shafts, comprising:

a transmission operating state detection block that detects parameters including at least a transmission ratio, a rotational speed of the input shaft and an input torque indicative of operating state of the transmission;

an axial thrust detection block that detects the axial thrusts of the drive and driven pulleys;

an inter-shaft force detection block that detects an inter-shaft force indicative of a force which pulls the input shaft and the output shaft against each other;

a friction coefficient calculation block that calculates a friction coefficient of the driven pulley including at least a radial component of the friction coefficient in accordance with predetermined relational equations based on the detected operating state, axial thrust and inter-shaft force;

a target axial thrust calculation block that calculates a target axial thrust of the driven pulley based on at least the calculated friction coefficient; and an axial thrust control block that controls the axial thrust of the driven pulley based on the calculated target axial thrust, wherein the friction coefficient calculation block calculates the radial component of the friction coefficient and a tangent component of the friction coefficient of the driven pulley in accordance with the predetermined relational equations, calculates an average friction coefficient of the driven pulley from the calculated radial component of the friction coefficient and the tangent component of the friction coefficient, and calculates a maximum tangent component of the friction coefficient of the driven pulley indicative of a friction coefficient just before the member slips from the driven pulley from the calculated average friction coefficient based on predetermined characteristics, and the target axial thrust calculation block calculates the target axial thrust based on at least the calculated maximum tangent component of the friction coefficient.

2. The apparatus according to claim 1, wherein the friction coefficient calculation block includes a learning block that learns the maximum tangent component of the friction coefficient with respect to a predetermined parameter to update the maximum tangent component of the friction coefficient when the vehicle runs, and the target axial thrust calculation block calculates the target axial thrust based on at least the updated friction coefficient.

3. The apparatus according to claim 1, wherein the friction coefficient calculation block includes a torque ratio calculation block that calculates a torque ratio indicative of a ratio of the input torque relative to a maximum torque transmittable by the transmission, and calculates the friction coefficient when the calculated torque ratio is equal to or greater than a predetermined value.

4. The apparatus according to claim 1, wherein the axial thrust control block controls the axial thrust of the drive pulley based on a predetermined ratio of the axial thrust of the drive pulley and the axial thrust of the driven pulley.

5. The apparatus according to claim 1, wherein the inter-shaft force detection block comprises a load sensor installed at a location close to a bearing of one of the input shaft and the output shaft.

6. An apparatus for controlling a continuously variable transmission having a drive pulley mounted on an input shaft connected to a prime mover mounted on a vehicle, a driven pulley mounted on an output shaft connected to driven wheels and a power transmissible member wound around the drive and driven pulleys to be clamped therebetween in response to axial thrust acting along axes of the input and output shafts, comprising:

a transmission operating state detection block that detects parameters including at least a transmission ratio, a rotational speed of the input shaft and an input torque indicative of operating state of the transmission;

an axial thrust detection block that detects the axial thrusts of the drive and driven pulleys;

an inter-shaft force detection block that detects an inter-shaft force indicative of a force which pulls the input shaft and the output shaft against each other;

a friction coefficient calculation block that calculates a friction coefficient of the driven pulley including at least a radial component of the friction coefficient in accordance with predetermined relational equations based on the detected operating state, axial thrust and inter-shaft force;

a target axial thrust calculation block that calculates a target axial thrust of the driven pulley based on at least the calculated friction coefficient; and an axial thrust control block that controls the axial thrust of the driven pulley based on the calculated target axial thrust, wherein the axial thrust control block includes a power transmission state discrimination block that discriminates whether a power transmission of the transmission is under a stable state, and when it is discriminated to be under the stable state, controls the axial thrust of the driven pulley based on the calculated target axial thrust in such a manner that the radial component of the friction coefficient is within a predetermined range.

7. An apparatus for controlling a continuously variable transmission having a drive pulley mounted on an input shaft connected to a prime mover mounted on a vehicle, a driven pulley mounted on an output shaft connected to driven wheels and a power transmissible member wound around the drive and driven pulleys to be clamped therebetween in response to axial thrust acting along axes of the input and output shafts, comprising:

a transmission operating state detection means for detecting parameters including at least a transmission ratio, a rotational speed of the input shaft and an input torque indicative of operating state of the transmission;

an axial thrust detection means for detecting the axial thrusts of the drive and driven pulleys;

an inter-shaft force detection means for detecting an inter-shaft force indicative of a force which pulls the input shaft and the output shaft against each other;

a friction coefficient calculation means for calculating a friction coefficient of the driven pulley including at least a radial component of the friction coefficient in accordance with predetermined relational equations based on the detected operating state, axial thrust and inter-shaft force;

a target axial thrust calculation means for calculating a target axial thrust of the driven pulley based on at least the calculated friction coefficient; and an axial thrust control means for controlling the axial thrust of the driven pulley based on the calculated target axial thrust, wherein the friction coefficient calculation means calculates the radial component of the friction coefficient and a tangent component of the friction coefficient of the driven pulley in accordance with the predetermined relational equations, calculates an average friction coefficient of the driven pulley from the calculated radial component of the friction coefficient and the tangent component of the friction coefficient, and calculates a maximum tangent component of the friction coefficient of the driven pulley indicative of a friction coefficient just before the member slips from the driven pulley from the calculated average friction coefficient based on predetermined characteristics, and the target axial thrust calculation means calculates the target axial thrust based on at least the calculated maximum tangent component of the friction coefficient.

8. The apparatus according to claim 7, wherein the friction coefficient calculation means includes a learning block that learns the maximum tangent component of the friction coefficient with respect to a predetermined parameter to update the maximum tangent component of the friction coefficient when the vehicle runs, and the target axial thrust calculation means calculates the target axial thrust based on at least the updated friction coefficient.

9. The apparatus according to claim 7, wherein the friction coefficient calculation means includes a torque ratio calculation means for calculating a torque ratio indicative of a ratio of the input torque relative to a maximum torque transmittable by the transmission, and calculates the friction coefficient when the calculated torque ratio is equal to or greater than a predetermined value.

10. The apparatus according to claim 7, wherein the axial thrust control means controls the axial thrust of the drive pulley based on a predetermined ratio of the axial thrust of the drive pulley and the axial thrust of the driven pulley.

11. The apparatus according to claim 7, wherein the inter-shaft force detection means comprises a load sensor installed at a location close to a bearing of one of the input shaft and the output shaft.

12. An apparatus for controlling a continuously variable transmission having a drive pulley mounted on an input shaft connected to a prime mover mounted on a vehicle, a driven pulley mounted on an output shaft connected to driven wheels and a power transmissible member wound around the drive and driven pulleys to be clamped therebetween in response to axial thrust acting along axes of the input and output shafts, comprising:

a transmission operating state detection means for detecting parameters including at least a transmission ratio, a rotational speed of the input shaft and an input torque indicative of operating state of the transmission;

an axial thrust detection means for detecting the axial thrusts of the drive and driven pulleys;

an inter-shaft force detection means for detecting an inter-shaft force indicative of a force which pulls the input shaft and the output shaft against each other;

a friction coefficient calculation means for calculating a friction coefficient of the driven pulley including at least a radial component of the friction coefficient in accordance with predetermined relational equations based on the detected operating state, axial thrust and inter-shaft force;

a target axial thrust calculation means for calculating a target axial thrust of the driven pulley based on at least the calculated friction coefficient; and an axial thrust control means for controlling the axial thrust of the driven pulley based on the calculated target axial thrust, wherein the axial thrust control means includes a power transmission state discrimination means for discriminating whether a power transmission of the transmission is under a stable state, and when it is discriminated to be under the stable state, controls the axial thrust of the driven pulley based on the calculated target axial thrust in such a manner that the radial component of the friction coefficient is within a predetermined range.

13. A method for controlling a continuously variable transmission having a drive pulley mounted on an input shaft connected to a prime mover mounted on a vehicle, a driven pulley mounted on an output shaft connected to driven wheels and a power transmissible member wound around the drive and driven pulleys to be clamped therebetween in response to axial thrust acting along axes of the input and output shafts, comprising the steps of:

detecting parameters including at least a transmission ratio, a rotational speed of the input shaft and an input torque indicative of operating state of the transmission;

detecting the axial thrusts of the drive and driven pulleys;

detecting an inter-shaft force indicative of a force which pulls the input shaft and the output shaft against each other;

calculating a friction coefficient of the driven pulley including at least a radial component of the friction coefficient in accordance with predetermined relational equations based on the detected operating state, axial thrust and inter-shaft force;

calculating a target axial thrust of the driven pulley based on at least the calculated friction coefficient; and controlling the axial thrust of the driven pulley based on the calculated target axial thrust, wherein the step of friction coefficient calculating calculates the radial component of the friction coefficient and a tangent component of the friction coefficient of the driven pulley in accordance with the predetermined relational equations, calculates an average friction coefficient of the driven pulley from the calculated radial component of the friction coefficient and the tangent component of the friction coefficient, and calculates a maximum tangent component of the friction coefficient of the driven pulley indicative of a friction coefficient just before the member slips from the driven pulley from the calculated average friction coefficient based on predetermined characteristics, and the step of target axial thrust calculation calculates the target axial thrust based on at least the calculated maximum tangent component of the friction coefficient.

14. The method according to claim 13, wherein the step of friction coefficient calculating includes the step of;

learning the maximum tangent component of the friction coefficient with respect to a predetermined parameter to update the maximum tangent component of the friction coefficient when the vehicle runs, and the step of target axial thrust calculating calculates the target axial thrust based on at least the updated friction coefficient.

15. The method according to claim 13, wherein the step of friction coefficient calculating includes the step of:

calculating a torque ratio indicative of a ratio of the input torque relative to a maximum torque transmittable by the transmission, and calculates the friction coefficient when the calculated torque ratio is equal to or greater than a predetermined value.

16. The method according to claim 13, wherein the step of axial thrust controlling controls the axial thrust of the drive pulley based on a predetermined ratio of the axial thrust of the drive pulley and the axial thrust of the driven pulley.

17. A method for controlling a continuously variable transmission having a drive pulley mounted on an input shaft connected to a prime mover mounted on a vehicle, a driven pulley mounted on an output shaft connected to driven wheels and a power transmissible member wound around the drive and driven pulleys to be clamped therebetween in response to axial thrust acting along axes of the input and output shafts, comprising the steps of:

detecting parameters including at least a transmission ratio, a rotational speed of the input shaft and an input torque indicative of operating state of the transmission;

detecting the axial thrusts of the drive and driven pulleys;

detecting an inter-shaft force indicative of a force which pulls the input shaft and the output shaft against each other;

calculating a friction coefficient of the driven pulley including at least a radial component of the friction coefficient in accordance with predetermined relational equations based on the detected operating state, axial thrust and inter-shaft force;

calculating a target axial thrust of the driven pulley based on at least the calculated friction coefficient; and controlling the axial thrust of the driven pulley based on the calculated target axial thrust, wherein the step of axial thrust controlling includes discriminating whether a power transmission of the transmission is under a stable state, and when it is discriminated to be under the stable state, controls the axial thrust of the driven pulley based on the calculated target axial thrust in such a manner that the radial component of the friction coefficient is within a predetermined range.

* * * * *